INVENTOR
JUN WATANABE

BY McGlew and Toren
ATTORNEYS

Feb. 21, 1967 JUN WATANABE 3,305,644

DIGIT NUMBER DISTRIBUTING SYSTEM FOR PUSHBUTTON TYPE TELEPHONE CALLING APPARATUS

Filed Sept. 5, 1963 6 Sheets-Sheet 2

INVENTOR
JUN WATANABE

BY McGlew and Toren
ATTORNEYS

INVENTOR
JUN WATANABE

BY McGlew and Toren
ATTORNEYS

INVENTOR
JUN WATANABE

BY McGlew and Toren
ATTORNEYS

INVENTOR
JUN WATANABE
BY
McGlew and Toren
ATTORNEYS

INVENTOR
JUN WATANABE

BY McGlew and Toren
ATTORNEYS

United States Patent Office 3,305,644

Patented Feb. 21, 1967

3,305,644

DIGIT NUMBER DISTRIBUTING SYSTEM FOR PUSHBUTTON TYPE TELEPHONE CALLING APPARATUS

Jun Watanabe, Tokyo, Japan, assignor to Oki Electric Industry Company Limited, Tokyo, Japan, a corporation of Japan Filed Sept. 5, 1963, Ser. No. 306,833
4 Claims. (Cl. 179—90)

This invention relates to a pushbutton type telephone calling device. It is an improvement of the pushbutton type telephone calling device according to U.S. Patent No. 3,078,349.

In the conventional pushbutton type telephone calling device, digit leads of a telephone call number and figure leads of respective digits are set by printed wiring on the front and back sides, respectively, of a wiring plate having a pushbutton. The wiring plate is perforated at the positions of those intersections of the lead wires on the front and back sides thereof corresponding to said telephone call number, to directly connect those lead wires by means of eyelets or the like so that, when the pushbutton is pushed, a number of pulses corresponding to the desired call number may be emitted through a counter consisting of a pulse generating distributor and a digit number distributor, and then the pulse circiut may be short-circuited to return the counter to the old position. Thus, by pushing the pushbutton, the other party can be directly called without operating the dial of the telephone apparatus. However, even if the number of digits is reduced, the digit number distributor will operate idly in accordance with the normal number of digits. This has resulted in a waste of time.

In order to eliminate this defect, the present invention is directed to a telephone calling device wherein, in a digit number distributor having a wiper sliding in turn on conductors corresponding to the number of digits, an electromagnetic coil circuit is automatically closed just after the distribution of the last digit irrespective of the different number of digits, and a returning lever, different from the feeding lever of the wiper, is operated by the excitation of the coil so that said digit number distributor may be immediately returned to the old position and the next preparation may be made.

Further, when the conventional telephone calling device, inserted between the telephone apparatus and the office line, is emitting pulses, for example, even in the case of emitting two pulses, the telephone apparatus will be kept short circuited until ten pulses have been completely emitted so that the pulse sounds of the calling device are prevented from entering the telephone apparatus. As a result, there is the disadvantage that it is difficult to identify the busy tone in the event the relay line is busy due to a call being transmitted from the station.

In order to eliminate this disadvantage, the present invention provides a telephone calling device wherein a switching contact point is provided between a telephone apparatus and the office line so that the telephone circuit may be short-circuited by said contact point only while an impulse is sent out to the office line, and the time of short-circuiting the telephone circuit therefore may be reduced. The short-circuiting is terminated by connecting a relay coil in the pulse generating circuit. Therefore, in case the relay does not operate, the telephone apparatus circuit will be doubly connected to the office line through the relay contact point and the wiper. Thus, even if the contact of the wiper becomes poor, the telephone apparatus circuit will not be disconnected and, except while generating pulses, the relay coil will be short-circuited. It is when pulses are being positively transmitted that the coil will be excited. The time of short-circuiting the telephone apparatus circuit is made as short as possible so that the calling device may be operated quickly and the sound transmitted from the office line may be heard positively.

An object of the present invention is to provide a telephone calling device wherein the operation is expedited by eliminating idle feeding of the digit number distributor, so that no time may be wasted.

A further object of the present invention is to provide a telephone calling device wherein the time of short-circuiting the telephone apparatus circuit is made as short as possible so that the sound transmitted from the office line or telephone office may be heard positively.

In the drawings

FIGURES 1*a* and 1*b* are schematic diagrams of the telephone calling device of the present invention;

Figure 4A:
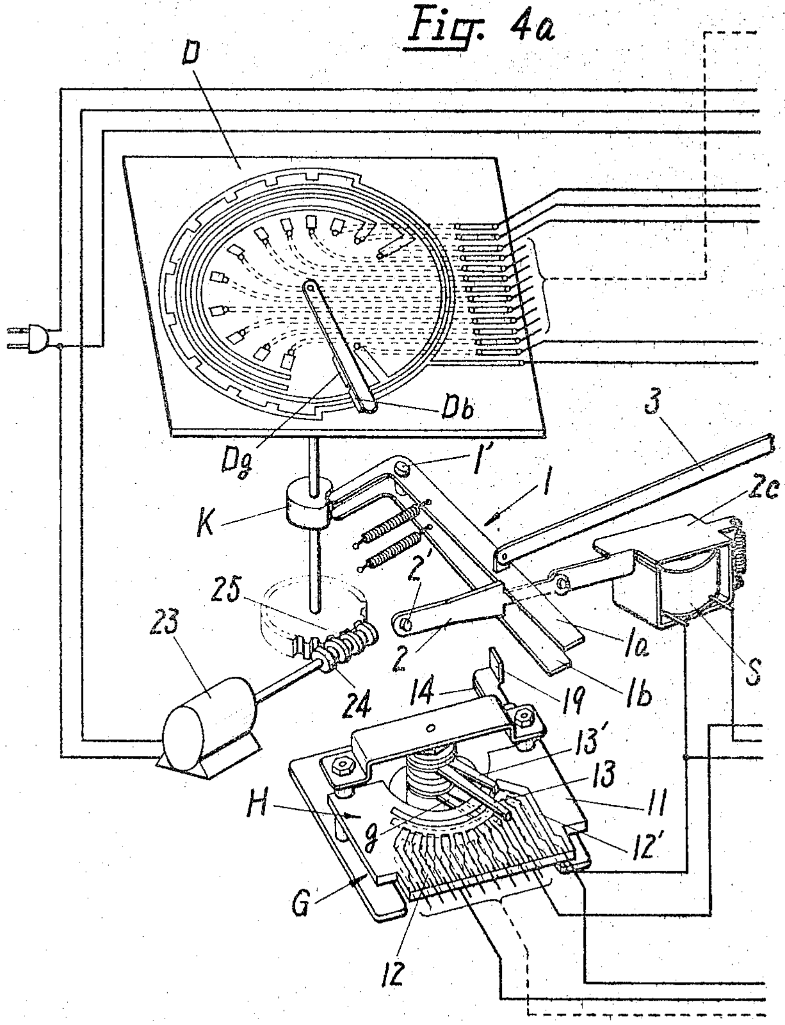
Figure 4B:
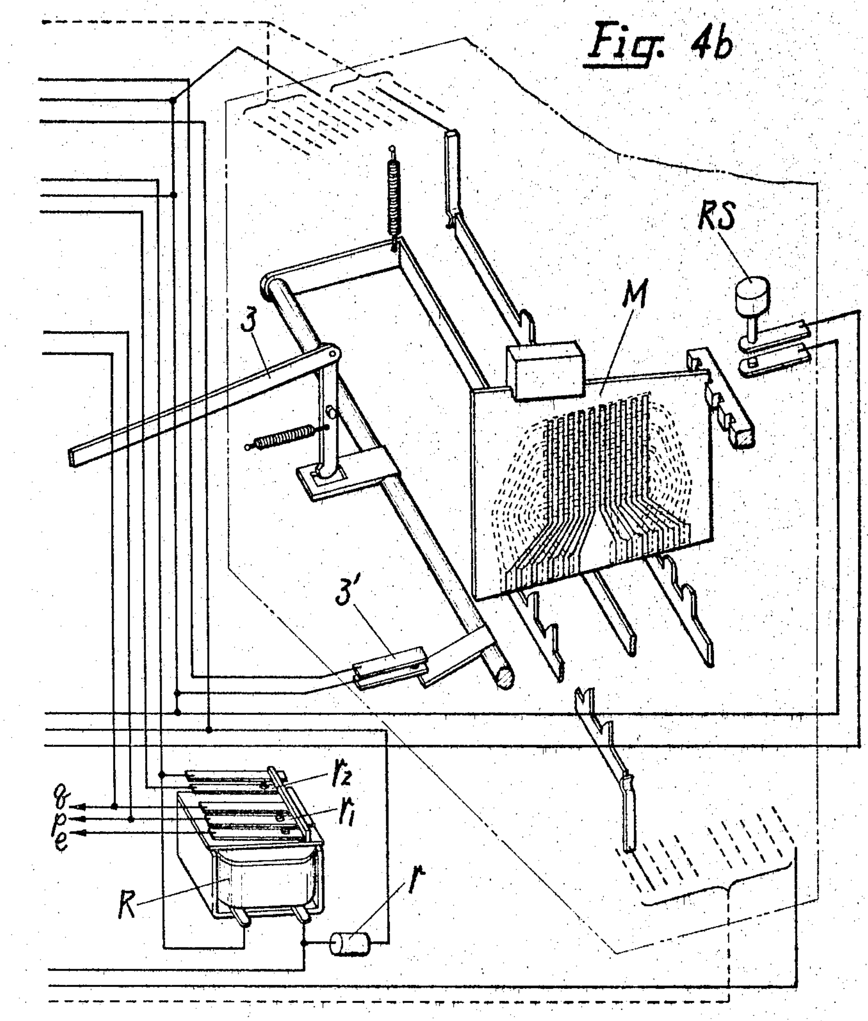
Figure 5:
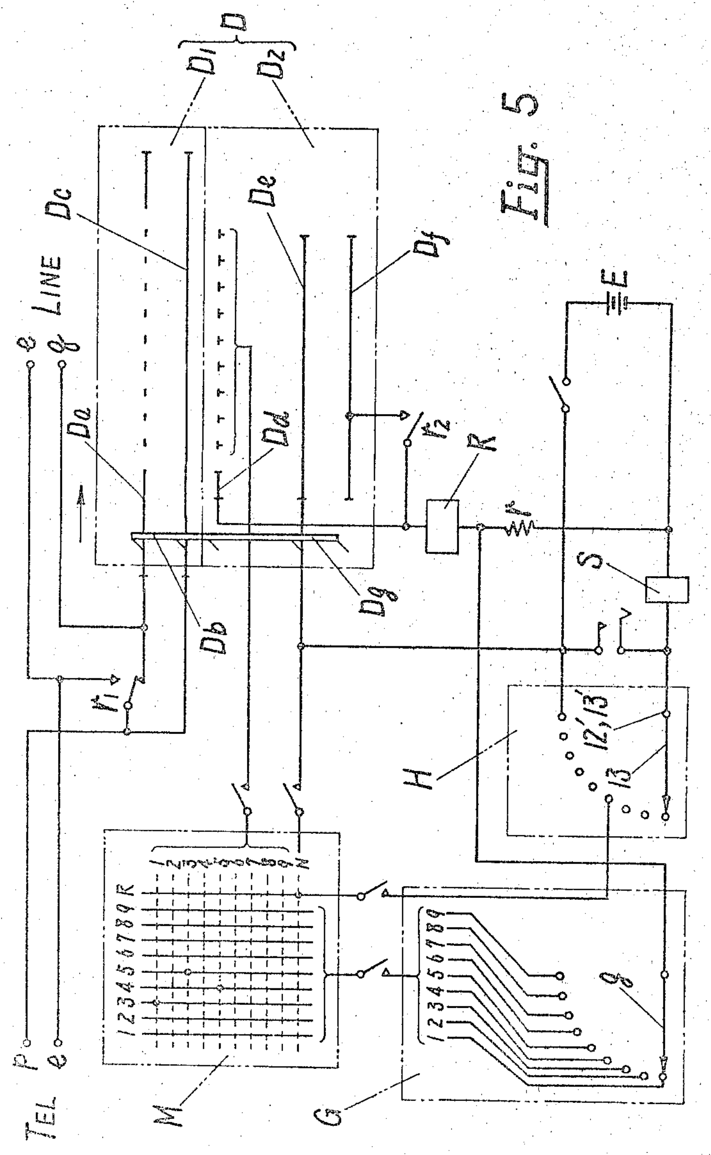

FIGURES 4*a* and 4*b* are schamatic diagrams of another embodiment of the telephone calling device of the present invention; and FIGURE 5 is a circuit wiring diagram of the calling device ilustrated in FIGURE 4.

Figure 1A:
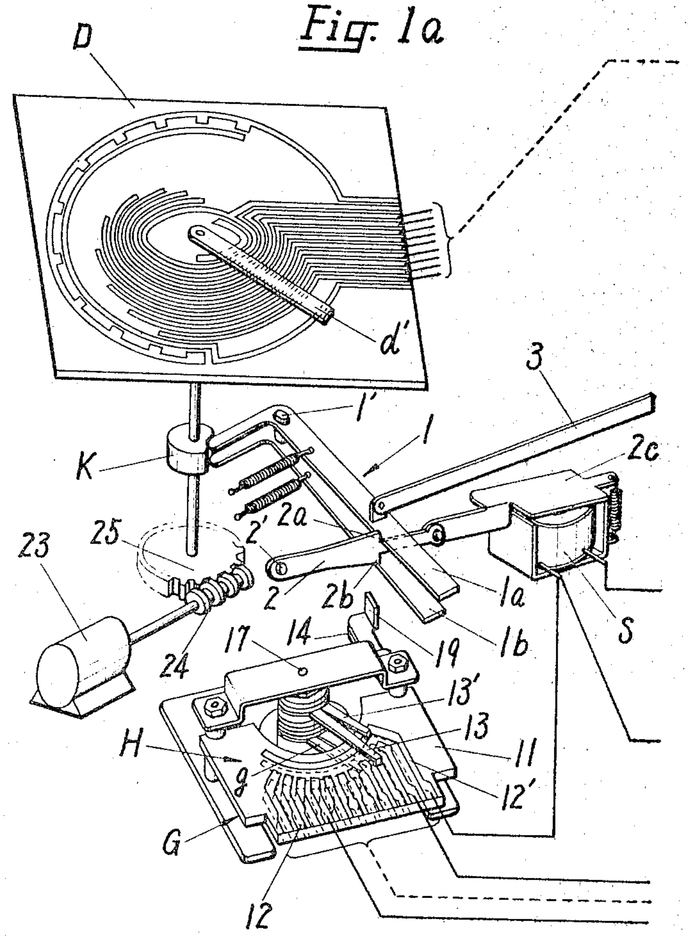
Figure 1B:
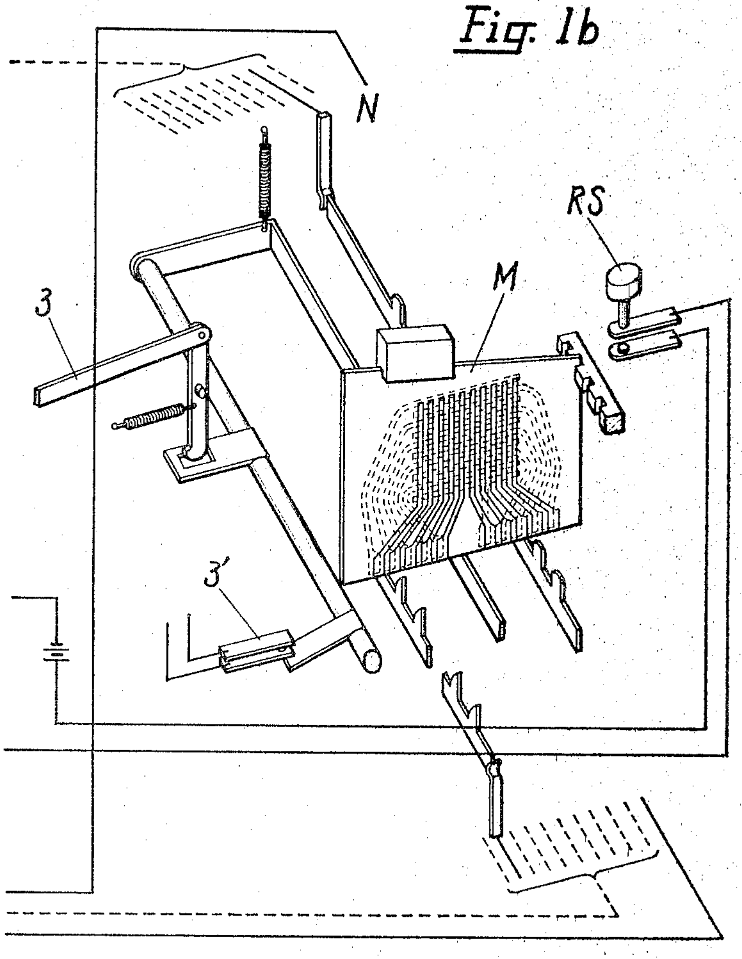

For example, the device shown in the drawings is to be used for two kinds of numbers, namely, 8-digit numbers, including 7-digit numbers and a O-oscillation, and 3-digit numbers for extensions. In FIGURE 1, M is a wiring plate on the front and back sides of which are printed and wired figure conductors and digit conductors, respectively, insulated from each other and intersecting at right angles with each other. The figure side is provided with conductors for 0 to 9. The digit number side is provided with conductors for *l* to *n*, which are ordinarily used digits and some spares. Each wiring plate is perforated at the positions of the intersections of the figure conductors and digit conductors on the front and back sides, respectively, corresponding to a call number, and such conductors are directly electrically connected with each other by means of eyelets extending through the perforations. The details of the connection are as mentioned in the specification of U.S. Patent No. 3,078,349. In an embodiment of the present invention, in the wiring plate representing a 3-digit extension number, the conductors N and R are connected with each other at the intersections.

Also, as mentioned in the specification of said patent, a pulse generating distributor D and digit number distributors G and H are provided with respective terminal conductors which are electrically connected as determined through figure switches and digit switches with the respective conductors on dialing or wiring plate M.

The pulse generating distributor D is provided with a slider *d'* so as to generate pulses and is related with the digit number distributors G and H. For this purpose, a switching lever assembly 1 mechanically connects a cam K, provided on a driving shaft for the pluse generating distributor D with the digit number distributors G and H, and comprises a pair of L-shaped operating levers 1*a* and 1*b* which are pivoted on a shaft 1' as a center. Corresponding ends of levers 1*a* and 1*b* are in contact with the cam K driven through gears 24 and 25 by a proper driving source 23 and moving in relation to the operation of the pulse generating distributor D. 2 is a switching restricting lever which is held between the operating levers 1*a* and 1*b* and is pivoted at one end, for vertical movement, on shaft 2' as a center. Lever 2 engages, at the shoulder part 2*a* or 2*b*, with the lever 1*a* or 1*b*, respectively, so as to restrict one lever and release the other lever.

An armature 2*c* is provided at the free end of the lever 2. An electromagnetic coil S is further provided opposite armature 2*c*. The digit number distributors G and H are provided with a returning lever 19 and a feeding lever 14 related with the forward ends of the levers 1*a* and 1*b*, respectively, as described later. Said digit number distributors G and H have wirings printed on the front and back sides and form two respectively independent distributors. Respective wipers *g* and 13 are insulated from each other and rotate around the same shaft as a center.

Figures 2, 3:
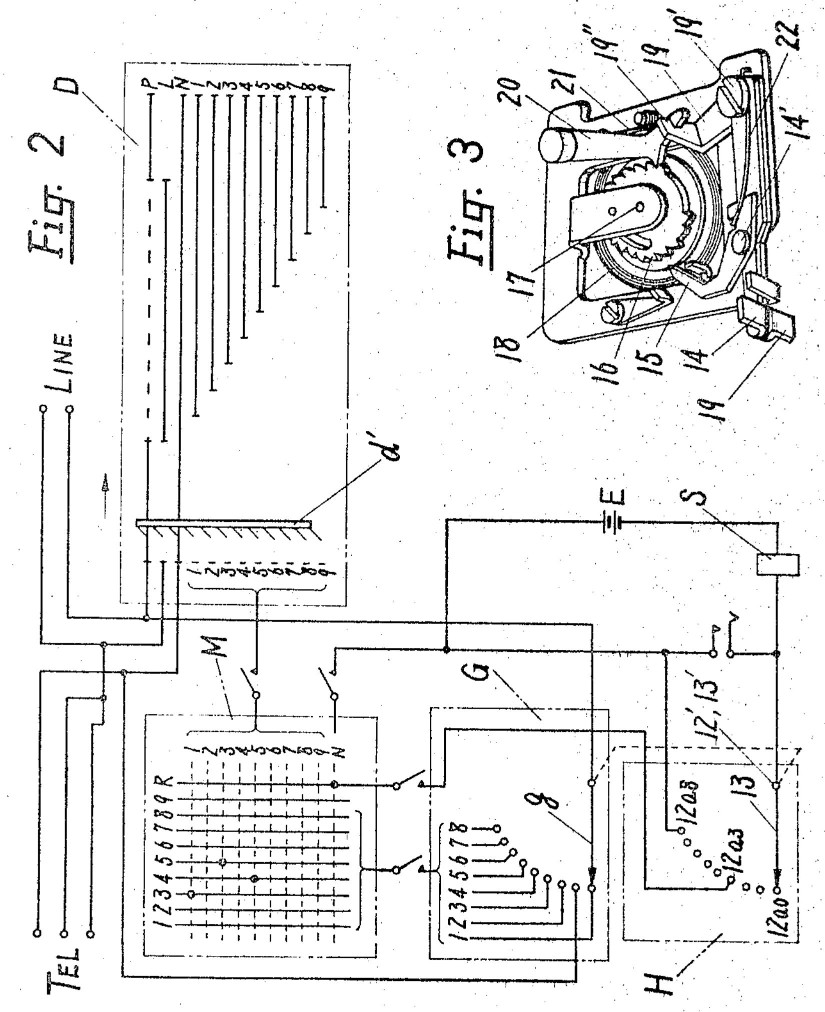
FIGURE 2 is a circuit wiring diagram of the telephone calling device of the present invention.
FIGURE 3 is a perspective view of the back of a digit number distributor.

The construction of the digit number distributors G and H will be explained with reference to FIGS. 1 and 3. Element 11 is a printed circuit board on which respective conductive terminal strips 12 and 12′, of a common terminal, are printed. The wipers 13 and 13′ slide on the strips $12_{ao}$, $12_{a1}$–$12_{a8}$ and the strip 12′, respectively. When lever 19 is moved, by cam K through lever 1*a*, around its pivot shaft 19′, a pawl 20 will be moved outwardly by end part 19″ of lever 19 to disengage pawl 20 from the teeth of a ratchet 16, an the ratchet will be returned to a start position by the spring 18. On the other hand, the movement of the feeding lever 14 will engage a feeding pawl 15, pivoted on a shaft 14′ on lever 14, with the teeth of ratchet 16 to advance ratchet 16 step by step. Thus, the wiper 13 fixed to the shaft 17 of the ratchet 16 will intermittently move on the printed strip 12 corresponding to the digit number. A spring 21 serves to bias the pawl 20 constantly toward the ratchet. A spring 22 serves to return the feeding lever 14 and the feeding pawl 15.

The terminals of the digit number distributor H are electrically connected through switch contacts with the digit number conductors of the distributing plate M. The common terminal strip 12′ is connected to one terminal of the electromagnetic coil S. The other terminal of the electromagnetic coil S is connected to one terminal of an electric potential source E as shown in FIGURE 2. The other terminal of electric potential source E is connected with the final terminal $12_{a8}$ of the digit number distributor H also, when the wiper 13 comes, for example, to the terminal $12_{a3}$, the circuit including electric source E-coil S-wiper 13-terminal $12_{a3}$-conductor N-electric source E will be completed. In either case, the coil S will be excited. When the coil S is excited, it will attract the armature 2*c*, so that the lever 2 will swing downwardly around the shaft 2′ as a center. Thus lever 1 will be released, and will therefore be subjected to the action of the cam K and will push the lever 19. The pawl 20 will be released from the ratchet 16, and therefore the wipers 13 and 13′ will be returned to the initial positions, by the bias of the spring 18 to be ready for the next operation.

Thus, when the last one digit of an 8-digit number and the 3rd digit of a 3-digit number are distributed, with the synchronization provided by the cam K, the digit distributor H will automatically return to the initial state. At the same time, the lever 3 related with the lever 1 will be moved, so that the latching lever releasably retaining dialing plate M in position will be released and the dialing plate will be biased upwardly by the force of the spring acting on its lower edge. The driving circuit will also be interrupted due to opening of switch 3′. RS is a cancelling button operable to effect ejection of a dialing plate which has been operated inadvertently.

FIGS. 4*a* and 4b illustrate schematically another embodiment of the present invention. This embodiment is the same as the device shown in FIGURE 1 in that the pulse generating distributor D consists of two groups of conductive strips $D_1$ and $D_2$ as shown in FIG. 5, which are on a printed circuit board. Respective sliders D*b* and D*g* are associated with the conductive strip groups $D_1$ and $D_2$. These sliders are rotated as a unit with cam K through the medium of motor 23 and gears 24 and 25.

When cam K completes one revolution, lever 1 is engaged in the recess in the cam and pivots, about shaft 1′ as the center, to operate lever 14 of the digit distributor to advance the ratchet (not illustrated) by one step to thereby advance wiper 13 one step. These operations are the same as described with reference to FIGS. 1*a*–3.

When the sliders D*b* and D*g* of the distributor D rotate, they will move in the direction indicated by the arrow in FIGURE 5. Therefore, in the distributor $D_1$, the common conductor D*c* and pulse conductor D*a* will be intermittently connected with each other through the slider D*b*, and in parallel with a switch *r*, when the relay R is not energized. Thus, the terminals P and *q* will have dual interconnection and there will be no possible faulting due to poor contact. By the operation of the relay R, the pulse circuit will be connected with the office line and the telephone circuit will be short-circuited.

When the slider D*g* begins to move in the direction indicated by the arrow, in the same manner as the slider D*b*, first of all, the common conductor D*e* and pulse conductor D*d* will be connected with each other to complete a circuit. The relay R will be initially energized to be ready for the operation. When the contacts *r*, are switched to short-circuit the telephone apparatus circuit connected between the terminals *P* and *e* and, at the same time, contacts $r_2$ are switched to connect the conductors D*e* and D*f* with each other through the slider D*g*, the relay R will be self-held and will be ready for the operation. After the dialing, initiated by the dialing plate M has been completed, and the other party is called by ringing the bell of the telephone set, relay R will be short circuited or shunted. Therefore, the device will be shunted so that no impulse will be generated, and the telephone circuit will be automatically connected with the office line. A load resistance *r* is inserted across the electrical potential source E when relay R is short circuited.

What is claimed is:

1. In a pushbutton type telephone calling device of the type including a digit number distributor having a wiper cyclically scanning, always in one direction, a plurality of conductors corresponding to the total number of available digits, dialing cards coded with the respective call numbers, circuit connections effected by selective operation of a respective dialing card to initiate cyclical action of said distributor to scan the respective coded called number, the distributor, in each cycle, scanning all the available digits and returning to the cycle start position while still moving in said one scanning direction, and means operable, upon return of the wiper to the cycle start position at the end of a complete scanning cycle, to deactivate said distributor and to restore the selected card to an inoperative position: the improvement comprising means biasing said wiper in the reverse direction to the cycle start positions; latching means restraining movement of said wiper in said reverse direction; and restoring means connected to said latching means and to said distributor and operable, responsive to scanning of a preselected number of said conductors substantially less than said total number of available digits, to release said latching means for return of said wiper in said reverse direction to said cycle start position.

2. In a pushbutton type telephone calling device, the improvement claimed in claim 1, in which said restoring means comprises a source of electric potential; a solenoid having a movable armature connected to said latching means; and a series energizing circuit for said solenoid including said source, said wiper, the last-scanned conductor of said preselected number of conductors, and said solenoid.

3. In a pushbutton type telephone calling device, the improvement claimed in claim 1, in which said wiper is rotatable; a ratchet rotatable with said wiper; said biasing means comprising a spring charged by rotation of said wiper in said one direction; said latching means comprising a pawl engaged with said ratchet; said restoring means, when operated, disengaging said pawl from said ratchet.

4. In a pushbutton type telephone calling device, the improvement claimed in claim 1, including a pulse generator electrically connected to said distributor; means mechanically interconnecting said pulse generator and said distributor and operable to step said wiper under the control of said pulse generator; a relay energized responsive to impulses transmitted from said pulse generator; switch contacts closed upon energization of said relay to short circuit the telephone circuit during transmission of impulses by said pulse generator; and means operable responsive to scanning of said preselected number of said conductors; to shunt said relay to de-energize the latter.

References Cited by the Examiner

UNITED STATES PATENTS

| | | | |
|---|---|---|---|
| 2,932,816 | 4/1960 | Stiefel et al. | |
| 3,060,275 | 10/1962 | Meacham et al. | 179—84 |
| 3,078,349 | 2/1963 | Sasaki | 179—90.2 |
| 3,120,584 | 2/1964 | Grunfelder et al. | |
| 3,156,782 | 11/1964 | Kobler | 179—90.2 |
| 3,200,205 | 8/1965 | Herter | 179—84 |

KATHLEEN H. CLAFFY, *Primary Examiner.*

J. W. JOHNSON, A. H. GESS, *Assistant Examiners.*